United States Patent
McMenamy et al.

[15] 3,671,835
[45] June 20, 1972

[54] MOTOR SPEED CONTROL WITH DROOP COMPENSATION

[72] Inventors: Frederick McMenamy, Bethel Park; Louis A. De More; Ludwig E. Del Mastro, both of Pittsburgh, all of Pa.

[73] Assignee: North American Rockwell Corporation, Pittsburgh, Pa.

[22] Filed: July 9, 1970

[21] Appl. No.: 53,520

[52] U.S. Cl. .............................. 318/308, 318/331, 318/332
[51] Int. Cl. ......................................................... H02p 5/06
[58] Field of Search .................. 318/308, 331, 332, 345, 434

[56] References Cited

UNITED STATES PATENTS

| | | |
|---|---|---|
| 3,515,971 | 6/1970 | Joslyn et al. .......................... 318/308 |
| 3,239,742 | 3/1966 | Mierendorf et al. .................... 318/331 |
| 3,419,777 | 12/1968 | Asseo .................................. 318/331 X |

Primary Examiner—J. D. Miller
Assistant Examiner—Robert J. Hickey
Attorney—John R. Bronaugh, E. Dennis O'Connor and Floyd S. Levison

[57] ABSTRACT

Compensating for droop in load-speed characteristic of a DC motor, an armature current signal, which is indicative of motor load, is amplified to control armature voltage. A negative feedback reduces amplification as armature voltage increases. An operational amplifier has an input related to armature current and a negative feedback responsive to armature voltage. A transistor in the feedback path varies the feedback impedance as a function of armature voltage.

6 Claims, 1 Drawing Figure

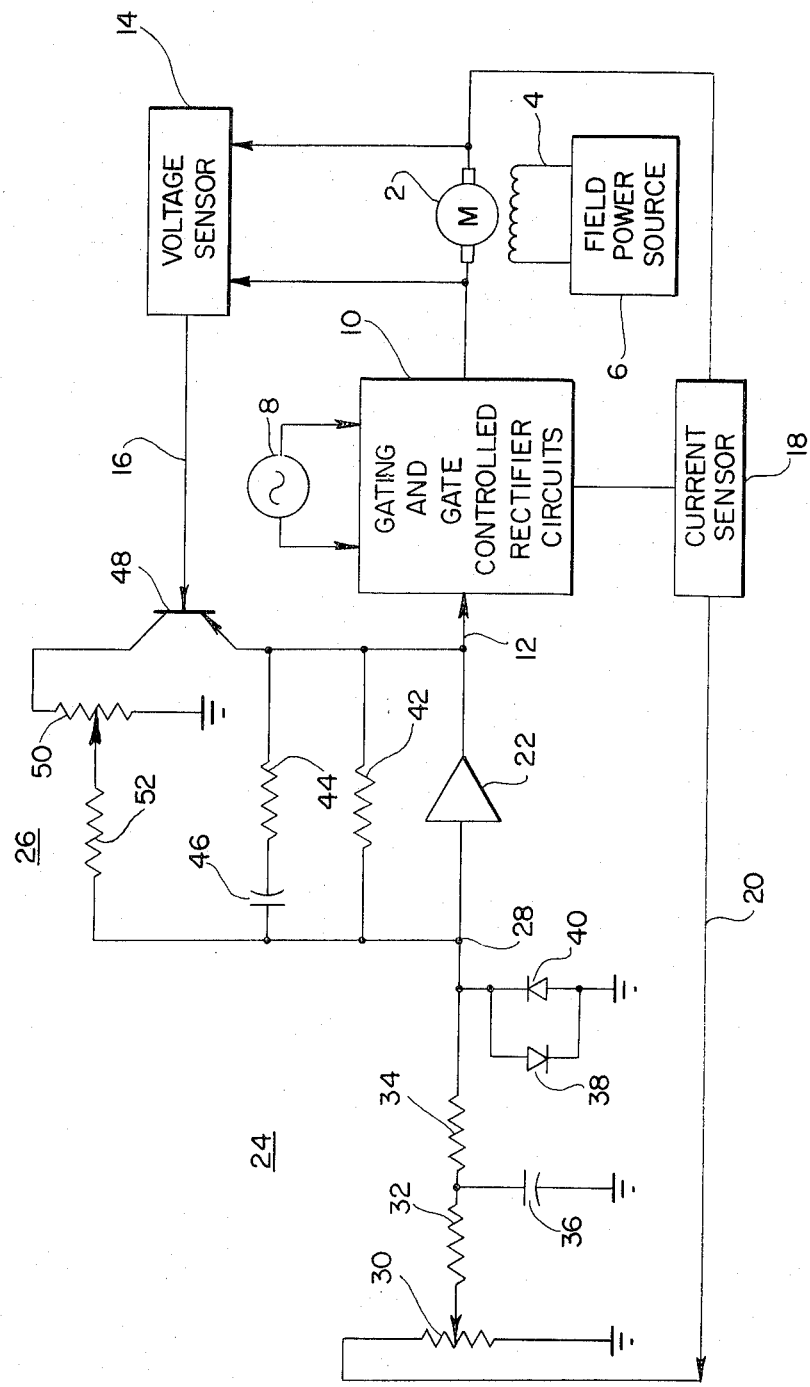

3,671,835

MOTOR SPEED CONTROL WITH DROOP COMPENSATION

BACKGROUND OF THE INVENTION

This invention relates to a control circuit for adjusting the armature voltage of a DC motor compensate for motor speed variation with varying load.

When a typical DC motor is operated with a constant armature voltage, the speed of the motor decreases as the load is increased. This decreasing speed characteristic, called "droop," changes as a function of initial, no-load armature voltage or speed setting. Change in droop increases by as much as 50 percent when the armature voltage is decreased from a high-speed setting to a low-speed setting.

SUMMARY OF THE INVENTION

The invention resides in a compensation network for regulating motor speed by controlling potential applied across an armature. Armature potential can be controlled by any well known armature voltage regulating circuit. As an example, an SCR gating circuit such as used in other types of known armature control circuits may be employed. Such a circuit requires a control signal representative of the amount of potential to be applied to the armature.

To properly compensate for droop, the regulating circuit control signal (1) increases as armature current increases and (2) decreases by up to 50 percent as armature voltage increases. The first change is accomplished by the positive feedback of a signal corresponding to armature current. The second change is effected by the negative feedback of a signal related to armature voltage. The negative feedback is accomplished by using a variable conductance means such as a transistor in the feedback path of an amplifier and by controlling the transconductance of the variable means or transistor in accordance with the armature voltage signal.

For high initial speed with high armature voltage, motor droop is low and the compensation gain is low. For low initial speeds with low armature voltage, the motor droop is high and compensation gain is high. In both cases, as the current signal increases, which indicates an decreasing speed, the speed demand correction is increased, and the motor speed remains substantially constant.

BRIEF DESCRIPTION OF THE DRAWING

The FIGURE is a schematic block diagram of a circuit responsive to armature voltage and armature current of a DC motor for controlling the gating of power to the armature of the motor.

DESCRIPTION OF THE PREFERRED EMBODIMENT

In the FIGURE, a motor 2 has field power supplied to a field coil 4 directly from a field power source 6, which is not controlled by the circuit of this invention. The armature power to motor 2 is gated from an AC source 8 by gating and gate controlled rectifier circuits 10 in response to a manual speed demand signal and a control signal received on a line 12. Gate-controlled rectifier circuits are well-known in the prior art for controlling electrical power to loads of various sorts. The rectifier circuits are cited for the sake of illustration only and could be replaced by any signal-controlled DC power supply capable of supplying sufficient power to run a motor.

The voltage across the armature is measured by a voltage sensor 14 to generate, on line 16, a signal representative of voltage across the armature. The current in the armature path of the motor is measured by a current sensor 18 to generate, on line 20, a signal representative of the amplitude of the current in the armature path.

An operational amplifier 22 is provided with an input network 24 and a feedback network 26. The signal on line 20 is applied to the input terminal of the input network for connection to the input terminal 28 of the operational amplifier. This connection is made to cause the signal from the output terminal of the amplifier on line 12 to increase in amplitude as the armature current increases in amplitude. In this analysis, the polarity reversal is ignored.

First, the signal on line 20 is applied across a scaling potentiometer 20, which can be varied to adjust the amount of change in gain desired for the particular motor being controlled. The signal tapped off the potentiometer is applied to an input resistor which is split into two series resistors 32 and 34. The junction of the series resistors is connected through a capacitor 36 to ground in order to smooth any cyclic variations in the armature current. These variations may result, for example, from rectification, without smoothing, of the armature current.

Back-to-back diodes 38 and 40 are connected at the input terminal 28 to protect against transient overloads. Because actual diodes are not ideal, they can be placed back-to-back, and neither will conduct for the low voltage values normally at the input terminals. But for high voltages one will conduct to protect the amplifier. Thus, when the feedback is assumed constant, the output on line 12 will be proportional to the sensed current.

Feedback circuit 26 includes several feedback paths. A direct path through resistor 42 provides a set point for minimum feedback. A second path, through a resistor 44 and capacitor 46, provides further smoothing of the output.

The third feedback path includes a transistor 48, a scaling potentiometer 50 and a resistor 52. The potentiometer is used to adjust the amount of change in gain desired for the particular motor being controlled. Resistor 52 is provided to limit the conductance of the feedback path.

Transistor 48 is connected at its control terminal to be controlled by the armature voltage signal on line 16 so as to vary the feedback impedance as a function of armature voltage. As the armature voltage increases, the transistor 48 turns on harder, and the effective collector to emitter resistance thereby decreases. As the transistor resistance decreases, the gain of the operational amplifier circuit decreases. This causes the gating control signal on line 12 to decrease by as much as 50 percent as armature voltage increases.

Thus, the circuit generates a gating control signal on line 12 which compensates for the droop in the speed versus load characteristic.

The transistor 48 is biased in its active region. It does not act as a switch, but as a continuously variable impedance.

While the invention has been particularly shown and described with reference to a preferred embodiment thereof, it will be understood by those skilled in the art that various changes in form and details may be made therein without departing from the spirit and scope of the invention.

What is claimed is:

1. An armature-current compensation circuit for a DC motor which exhibits an increasing droop in its motor-speed-versus-load curve as armature voltage decreases, comprising:
    an amplifier having input and output terminals,
    input means for applying a signal representative of amplitude of current in an armature path of the motor to the input terminal,
    feedback means connecting the input and output terminals, the feedback means comprising variable conductance means for conducting feedback current, the variable conductance means having a control terminal for controlling conductance of said feedback current,
    control means for applying a signal representative of the voltage across said armature to the control terminal, and
    regulating means connected to the output terminal of the amplifier and responsive to a signal from the output terminal for regulating voltage supplied to the armature.

2. A circuit according to claim 1 wherein the input means comprises a current sensor connected to the armature path for deriving a signal representative of the amplitude of current in the armature path, and an input network for scaling and smoothing the signal from the current sensor and for applying a smoothed and scaled signal to the input terminal.

3. The circuit according to claim 1 wherein the feedback means comprises a linear resistor directly connecting the input and output terminals, and a series circuit comprising the variable conductance means and a scaling potentiometer connected between the input and output terminals.

4. A circuit according to claim 1 wherein said variable conductance means comprises a transistor biased in its active region.

5. A method of compensating for a droop in the motor-speed-versus-load characteristic of a DC motor comprising the steps of generating a first signal representative of the amplitude of current in an armature path of the motor, generating a second signal representative of the voltage across the armature of the motor, generating a third signal having an amplitude substantially directly proportional to the first signal and varying inversely with the second signal, and using said third signal to control the amount of power applied to the armature of the motor, wherein said third signal generating step comprises feeding the first signal to an amplifier, controlling amplifier feedback by the second signal, to thereby produce the third signal at an output of the amplifier.

6. The method of claim 5 wherein the second signal generating step comprises measuring voltage across the armature, producing a bias signal, feeding the third signal through an impedance to an input of the amplifier, and reducing the impedance according to a magnitude of the bias signal.

* * * * *